(12) United States Patent
Kunii

(10) Patent No.: US 8,310,687 B2
(45) Date of Patent: Nov. 13, 2012

(54) DEVICE, SYSTEM, AND COMPUTER-READABLE RECORD MEDIUM STORING PROGRAM FOR USING INFORMATION ASSOCIATED WITH IMAGES

(75) Inventor: Tadahiro Kunii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 967 days.

(21) Appl. No.: 12/345,509

(22) Filed: Dec. 29, 2008

(65) Prior Publication Data

US 2009/0168115 A1    Jul. 2, 2009

(30) Foreign Application Priority Data

Dec. 27, 2007  (JP) ................................ 2007-336358

(51) Int. Cl.
*G06F 3/12*    (2006.01)
(52) U.S. Cl. .................... 358/1.1; 379/93.23; 379/93.17; 379/93.19; 348/14.01; 348/14.02; 348/14.03; 348/14.04; 348/14.05; 348/14.06; 348/14.07; 348/14.08; 348/14.09; 348/14.1; 715/838; 715/835; 715/810; 715/765; 715/764
(58) Field of Classification Search .......... None
See application file for complete search history.

(56) References Cited

U.S. PATENT DOCUMENTS

| | | | |
|---|---|---|---|
| 5,347,628 A | 9/1994 | Brewer et al. | |
| 5,542,039 A | 7/1996 | Brinson et al. | |
| 5,545,857 A | 8/1996 | Lee et al. | |
| 6,040,831 A | 3/2000 | Nishida | |
| 6,081,266 A | 6/2000 | Sciammarella | |
| 6,292,210 B1 | 9/2001 | Gerszberg et al. | |
| 6,587,596 B1 | 7/2003 | Haeberli | |
| 6,850,254 B1 | 2/2005 | Banning et al. | |
| 7,035,865 B2 | 4/2006 | Doss et al. | |
| 7,080,324 B1 | 7/2006 | Nelson et al. | |
| 7,284,002 B2 | 10/2007 | Doss et al. | |

(Continued)

FOREIGN PATENT DOCUMENTS

CN    1652565 A    8/2005

(Continued)

OTHER PUBLICATIONS

Machine translation of Japanese Published Patent Application No. 2006-093863, Muramatsu, Apr. 2006.*

(Continued)

*Primary Examiner* — Benny Q Tieu
*Assistant Examiner* — Paul F Payer
(74) *Attorney, Agent, or Firm* — Baker Botts L.L.P.

(57) ABSTRACT

In an image information storage device, a registration information storage unit stores registration information while associating it with first image data stored in an image data storage unit, while storing registration information for area information representing one of areas set in a drawing area of first image data stored in the image data storage unit. When an input specifying an area represented by area information is made while an image represented by first image data stored in the image data storage unit is displayed on a display screen, a search unit searches for second image data associated with registration information that has been associated with the area information in the registration information storage unit. An output control unit controls output of image/information to the display screen while outputting an image represented by the second image data search by the search unit to the display screen.

16 Claims, 9 Drawing Sheets

U.S. PATENT DOCUMENTS

| | | | |
|---|---|---|---|
| 7,664,485 B2 | 2/2010 | Twerdahl et al. | |
| 7,782,244 B2 | 8/2010 | McRae | |
| 7,783,290 B2 * | 8/2010 | Kim | 455/433 |
| 8,064,902 B2 | 11/2011 | Kunii | |
| 8,089,389 B2 | 1/2012 | Mcrae | |
| 8,132,110 B1 * | 3/2012 | Appelman et al. | 715/752 |
| 2002/0090068 A1 | 7/2002 | Song | |
| 2002/0097262 A1 | 7/2002 | Iwase et al. | |
| 2004/0102225 A1 | 5/2004 | Furuta et al. | |
| 2004/0171394 A1 | 9/2004 | Daita | |
| 2004/0207722 A1 * | 10/2004 | Koyama et al. | 348/14.02 |
| 2005/0120307 A1 | 6/2005 | Suzuki | |
| 2006/0004712 A1 * | 1/2006 | Hakala et al. | 707/3 |
| 2006/0063562 A1 | 3/2006 | Hirai | |
| 2006/0135197 A1 | 6/2006 | Jin et al. | |
| 2007/0035564 A1 | 2/2007 | Katsuyama | |
| 2007/0083651 A1 | 4/2007 | Ishida | |
| 2008/0070553 A1 | 3/2008 | Yamakawa et al. | |
| 2008/0084576 A1 | 4/2008 | Dantwala | |
| 2008/0129580 A1 | 6/2008 | McRae | |
| 2008/0180304 A1 | 7/2008 | McRae | |
| 2008/0180305 A1 | 7/2008 | McRae | |
| 2008/0207231 A1 | 8/2008 | Kunii | |
| 2009/0021761 A1 | 1/2009 | Suzuki et al. | |
| 2009/0027721 A1 | 1/2009 | Misumi et al. | |
| 2009/0074159 A1 | 3/2009 | Goldfarb et al. | |
| 2009/0153885 A1 | 6/2009 | Yamaguchi et al. | |
| 2009/0153903 A1 | 6/2009 | Kunii et al. | |
| 2009/0154677 A1 | 6/2009 | Kunii et al. | |
| 2009/0168115 A1 | 7/2009 | Kunii | |
| 2010/0248703 A1 | 9/2010 | Mears et al. | |
| 2011/0074700 A1 | 3/2011 | Sharp | |
| 2011/0123009 A1 | 5/2011 | Mears et al. | |
| 2011/0161856 A1 | 6/2011 | Nurmi et al. | |

FOREIGN PATENT DOCUMENTS

| | | |
|---|---|---|
| JP | H03-222033 A | 10/1991 |
| JP | H05-091179 A | 4/1993 |
| JP | H09-034392 A | 2/1997 |
| JP | H09-034483 A | 2/1997 |
| JP | H09-083630 A | 3/1997 |
| JP | 2002-232555 A | 8/2002 |
| JP | 2004-140695 A | 5/2004 |
| JP | 2004-201222 A | 7/2004 |
| JP | 2004-260657 A | 9/2004 |
| JP | 2004-304719 A | 10/2004 |
| JP | 2006-042170 A | 2/2006 |
| JP | 2006-093863 A | 4/2006 |
| JP | 2006-165821 A | 6/2006 |
| JP | 2006-222504 A | 8/2006 |
| JP | 2007-028077 A | 2/2007 |
| JP | 2007-068234 A | 3/2007 |
| JP | 2007-201906 A | 8/2007 |
| JP | 2009-147566 A | 7/2009 |

OTHER PUBLICATIONS

Machine translation of Japanese Published Patent Application No. 2006-165821, Masuda et al., Jun. 2006.*

Japan Patent Office, Notification of Reasons for Rejection for Japanese Patent Application No. 2008-064321 (counterpart to above-captioned patent application), dispatched Jun. 8, 2010.

The State Intellectual Property Office of the People'S Republic of China, Notification of First Office Action for Chinese Patent Application No. 200810186729.7 (counterpart to above-captioned patent application), issued Aug. 5, 2010.

United States Patent and Trademark Office, Notice of Allowance and Fee(s) Due for U.S. Appl. No. 12/337,364, mailed Sep. 11, 2012.

* cited by examiner

14b1

| PERSONAL NUMBER (P1) | NAME (P2) | PHONE NUMBER (P3) |
|---|---|---|
| 1 | JIRO SUZUKI | 052-xxx-1111 |
| 2 | TARO KATO | 052-xxx-2222 |
| 3 | EISUKE KIMURA | 052-xxx-3333 |
| 4 | SHINJI TAKAHASHI | 052-xxx-4444 |
| 5 | DAISAKU SATO | 052-xxx-5555 |

| IMAGE NAME (Q1) | AREA INFORMATION (Q2) | | | | PERSONAL NUMBER (Q3) | |
|---|---|---|---|---|---|---|
| | X COORDINATE | Y COORDINATE | SHAPE | SIZE | | |
| FRIENDS | 7 | 5 | ELLIPSE #2 | 1.6 | 1 | (SUZUKI) |
| | 5 | 7 | CIRCLE | 1.8 | 2 | (KATO) |
| | 2 | 6 | ELLIPSE #2 | 1.3 | 3 | (KIMURA) |

| IMAGE NAME (Q1) | AREA INFORMATION (Q2) | | | | PERSONAL NUMBER (Q3) | |
|---|---|---|---|---|---|---|
| | X COORDINATE | Y COORDINATE | SHAPE | SIZE | | |
| COWORKERS | 9 | 3 | ELLIPSE #2 | 1.2 | 1 | (SUZUKI) |
| | 2 | 2 | CIRCLE | 1.5 | 4 | (TAKAHASHI) |
| | 6 | 6 | CIRCLE | 1.1 | 5 | (SATO) |

FIG.3C

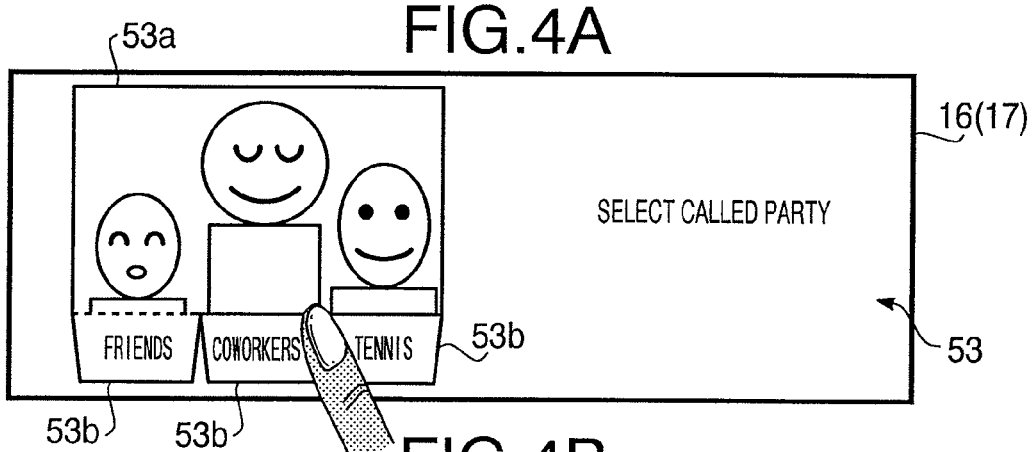
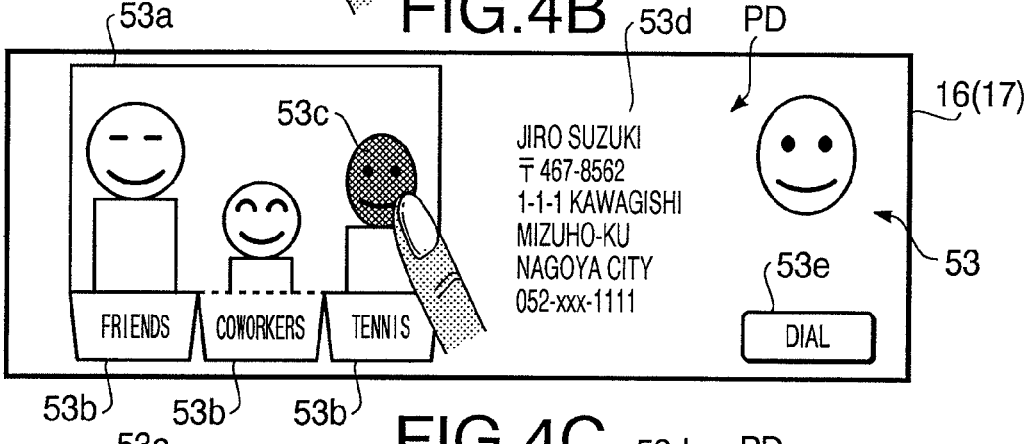
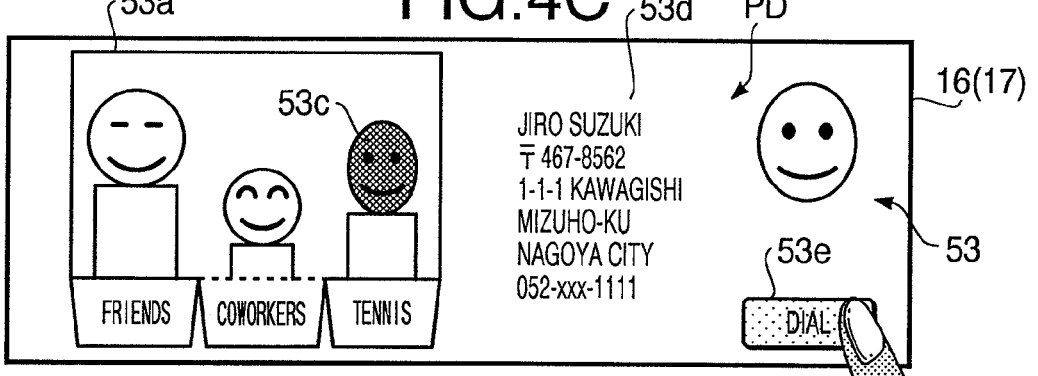
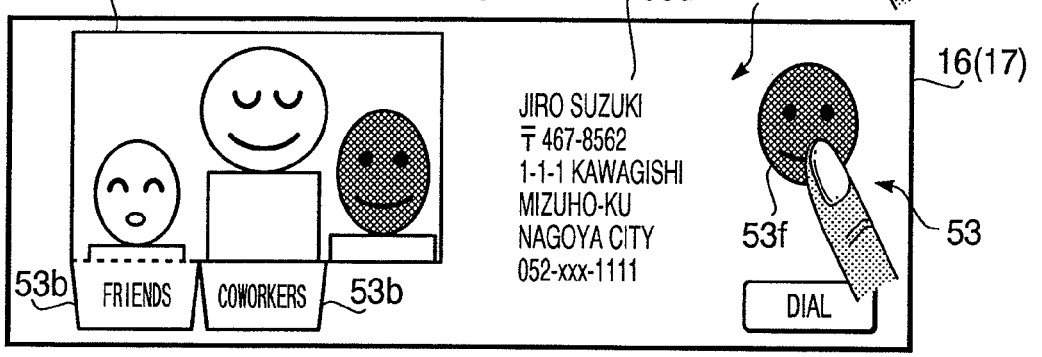

| IMAGE NAME | AREA INFORMATION | | | | NAME | PHONE NUMBER | PERSON NUMBER | |
|---|---|---|---|---|---|---|---|---|
| | X COORDINATE | Y COORDINATE | SHAPE | SIZE | | | | L1 |
| FRIENDS | 7 | 5 | ELLIPSE #2 | 1.6 | JIRO SUZUKI | 052-xxx-1111 | A1 | (SUZUKI) |
| | 5 | 7 | CIRCLE | 1.8 | TARO KATO | 052-xxx-2222 | A2 | (KATO) |
| | 2 | 6 | ELLIPSE #2 | 1.3 | EISUKE KIMURA | 052-xxx-3333 | A3 | (KIMURA) |

| IMAGE NAME | AREA INFORMATION | | | | NAME | PHONE NUMBER | PERSON NUMBER | |
|---|---|---|---|---|---|---|---|---|
| | X COORDINATE | Y COORDINATE | SHAPE | SIZE | | | | L2 |
| COWORKERS | 9 | 3 | ELLIPSE #2 | 1.2 | | | A1 | (SUZUKI) |
| | 2 | 2 | CIRCLE | 1.5 | SHINJI TAKAHASHI | 052-xxx-4444 | B4 | (TAKAHASHI) |
| | 6 | 6 | CIRCLE | 1.1 | DAISAKU SATO | 052-xxx-5555 | B5 | (SATO) |

R1 / R2 / R3 / R4 / R5 ; PD

DEVICE, SYSTEM, AND COMPUTER-READABLE RECORD MEDIUM STORING PROGRAM FOR USING INFORMATION ASSOCIATED WITH IMAGES

CROSS-REFERENCE TO RELATED APPLICATION

This application claims priority under 35 U.S.C. §119 from Japanese Patent Application No. 2007-336358 filed on Dec. 27, 2007. The entire subject matter of the application is incorporated herein by reference.

BACKGROUND

1. Technical Field

The present invention relates to an image information storage device, an image information processing system and a computer-readable record medium storing a program for image information processing.

2. Prior Art

Communication devices (e.g. cellular phone) having the so-called telephone directory function are widely available today. With the telephone directory function, textual information such as a name (personal name, company name, etc.) and a phone number, e-mail address, etc. corresponding to the name can be stored in a storage unit, and multiple pieces of textual information already stored in the storage unit can be successively displayed on a display unit (e.g. LCD) as needed.

For example, an electronic device described in paragraph 0007 of Japanese Patent Provisional Publication No. 2006-93863 (hereinafter referred to as a "patent document #1") has a telephone directory function of storing image data in addition to the aforementioned textual information. When a search is conducted by use of the telephone directory function, the electronic device allows the user to easily understand the relationship between a person (whose name, image data, etc. have been stored in a storage unit of the electronic device) and the user or another person based on an image (e.g. photo) including two or more subjects.

However, the electronic device of the patent document #1, in which each piece of image data is associated with a piece of information (textual information) in a one-to-one correspondence, is incapable of judging whether information associated with a piece of image data is identical with information associated with another piece of image data or not even when the two pieces of image data have been associated with the same information.

Therefore, in cases where each area cut out from a group photo (including two or more people as subjects) is associated with personal information (name, phone number, etc.), for example, the electronic device of the patent document #1 is incapable of recognizing that a person included in a group photo is identical with a person included in another group photo (even when the same person is included in the two group photos) and handles the two identical persons as different persons.

Thus, even when a user, who has acquired information on a person from a group photo, wants to search for another group photo including the person, the electronic device of the patent document #1 (which handles two persons included in different group photos as different persons as above) is incapable of assisting the user with the search. In such cases, the user has to manually search for and find another group photo (including the person) in the memory of the electronic device, which is extremely troublesome to the user.

SUMMARY OF THE INVENTION

The present invention, which has been made in consideration of the above problems, is advantageous in that an image information storage device, an image information processing system and a computer-readable record medium storing a program for image information processing, capable of assisting the effective use of the information (registration information) associated with each image, can be provided.

In accordance with an aspect of the present invention, there is provided an image information storage device, which is provided with an image data storage unit which stores first image data, a registration information storage unit which stores prescribed registration information while associating the registration information with the first image data stored in the image data storage unit, the registration information storage storing registration information for area information representing one selected from one or more areas set in a drawing area of a piece of first image data stored in the image data storage unit, a search unit which conducts a search, when an input for specifying an area represented by area information is made while an image represented by a piece of first image data stored in the image data storage unit is displayed on a display screen, for second image data associated with registration information based on the registration information associated with the area information representing the specified area, and an output control unit which controls output of an image and/or information to the display screen while outputting an image represented by the second image data, which is searched by the search unit, to the display screen.

With the image information storage device configured as above, all images that have been associated with registration information that has been associated with the specified area in one image (displayed on the display screen) can be searched for and extracted based on the (one or more pieces of) registration information associated with the specified area. Therefore, when two or more images are extracted by the search, additional information that can not be acquired from one image can be acquired, which allows the user to obtain a lot of information and gain a detailed grasp of a subject, object, etc. in the specified area of the displayed image with ease, by which the user is assisted to make effective use of the registration information associated with each image.

In accordance with another aspect of the present invention, there is provided an computer-readable record medium storing computer-readable instructions for a computer of an image information storage device, equipped with an image data storage unit and a registration information storage unit which stores prescribed registration information while associating the registration information with the first image data stored in the image data storage unit, the registration information storage storing registration information for area information representing one selected from one or more areas that have been set in a drawing area of a piece of first image data stored in the image data storage unit. The instructions cause the computer to execute a search step of conducting a search, when an input for specifying an area represented by area information is made while an image represented by first image data stored in the image data storage unit is displayed on a display screen, for second image data associated in the registration information storage unit with registration information that has been associated with area information in the registration information storage unit, based on the registration information associated with area information representing the specified area, and an output control step of outputting result of the search by the search step to the display screen.

By making a computer of an image information storage device operate according to the computer-readable instructions acquired (loaded, installed, etc.) from the computer-readable record medium, effects similar to those of the image information storage device described above can be achieved.

In accordance with another aspect of the present invention, there is provided an image information processing system which includes an image information storage device, a registration information storage unit which stores prescribed registration information while associating the registration information with the first image data stored in the image data storage unit of the image information storage device, the registration information storage storing registration information for area information representing one selected from one or more areas set in a drawing area of a piece of first image data stored in the image data storage unit, and an information processing device which is connected with the image information storage device and the registration information storage unit and includes a search unit which conducts a search, when an input for specifying an area represented by area information is made while an image represented by a piece of first image data stored in the image data storage unit of the image information storage device is displayed on a display screen, for second image data associated with registration information, based on the registration information associated with the area information representing the specified area, and an output control unit which controls output of an image and/or information to the display screen while outputting result of the search by the search unit to the display screen.

With the image information processing system configured as above, effects similar to those of the image information storage device described above can be achieved.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 3A is a schematic diagram showing an example of the configuration of data stored in a personal information memory of the MFP.

FIGS. 3B and 3C are schematic diagrams showing an example of the configuration of data stored in an image information memory of the MFP.

FIGS. 4A-4D are schematic diagrams showing examples of a calling screen which is displayed on an LCD of the MFP during the execution of a calling process.

FIGS. 9A and 9B are schematic diagrams showing an example of the configuration of data stored in a telephone directory memory as a modification of the telephone directory memory (personal information memory, image information memory) of FIGS. 3A-3C.

DETAILED DESCRIPTION OF THE EMBODIMENTS

Figure 1:
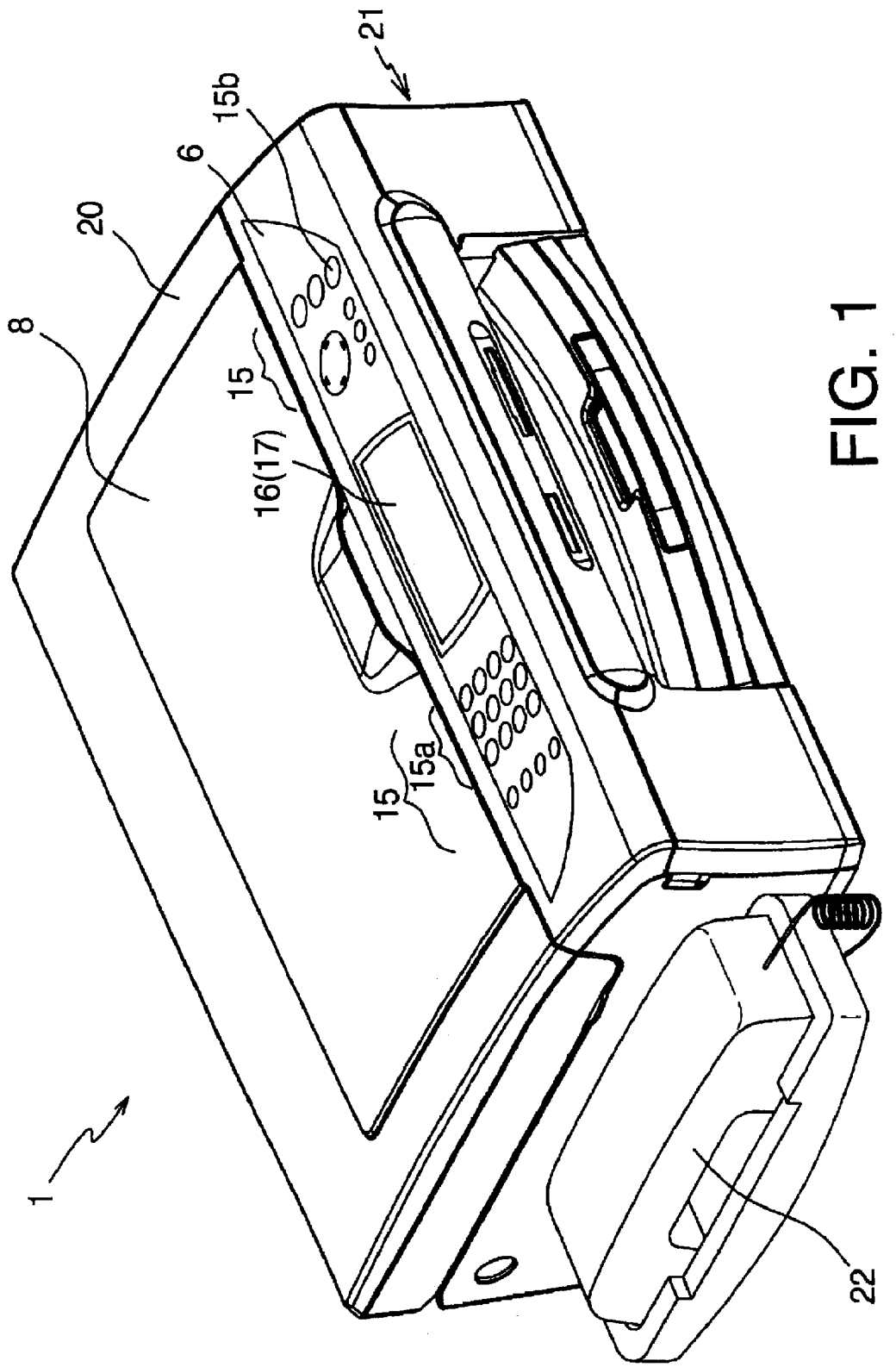
FIG. 1 is a perspective view showing the external appearance of an MFP (Multi-Function Peripheral) as an image information storage device in accordance with a first embodiment of the present invention.

Referring now to the drawings, a description will be given in detail of preferred embodiments in accordance with the present invention.

<Embodiment 1>

FIG. 1 is a perspective view showing the external appearance of an MFP (Multi-Function Peripheral) 1 as an image information storage device in accordance with a first embodiment of the present invention.

The MFP 1, which is connected to a telephone circuit 100 (see FIG. 2), has not only the telephone function (telephone call via the telephone circuit 100) and the facsimile function (data communication via the telephone circuit 100) but also various other functions such as the scanner function, copy function, PC print function and media print function. The MFP 1 of this embodiment is configured as a device capable of searching for and extracting all photos that have been associated with a piece of personal information (registration information), which has been associated with an area in a photo, based on the personal information and thereby assisting the user to make effective use of the personal information associated with the photo (details will be explained later).

A scanner 20 for scanning a document, etc. during the execution of the facsimile function, scanner function or copy function is provided at the top of the MFP 1. A glass plate (flat bed), on which the user places a document to be scanned, is covered by a document cover 8. For the document scanning, the user opens the document cover 8 upward, places a document on the glass plate, and closes the document cover 8 to fix the document on the flat bed.

When document scanning is ordered by the user, the image on the (lower) surface of the document is scanned by a document scanning sensor (unshown) which is situated underneath the glass plate. Image data of the scanned image is stored in a prescribed storage area of a RAM 13 (see FIG. 2) which will be described later.

A printer 21 (implemented by a so-called inkjet printer) is installed in the housing of the MFP 1 as a unit for printing an image on a sheet (e.g. paper). The printer 21 is equipped with a print head (using inks of four colors CMYK (cyan, magenta, yellow, black)), a sheet feed mechanism and a recovery mechanism in order to execute color printing. The print head includes a plurality of nozzles (ink discharging holes). The printer 21 executes the printing of an image on a sheet by discharging the inks from the nozzles while feeding the sheet with the sheet feed mechanism.

An operation panel 6 in a horizontally elongated shape is situated in front of the document cover 8. The operation panel 6 includes operation keys 15, an LCD (Liquid Crystal Display) 16 and a well-known touch panel 17 which is formed integrally with the LCD 16. The operation keys 15 include various buttons such as numeric buttons 15a for inputting a phone number during the use of the telephone function or the facsimile function and a power button 15b for turning ON/OFF the power of the MFP 1.

The LCD 16 serves as a display screen for displaying a variety of images and information, such as operational instructions, the status of a process in execution and information corresponding to the pressing of the operation keys 15 and the touch panel 17.

When the telephone function or the facsimile function of the MFP 1 is used, a call reception screen 51 (see FIG. 6A for example), an absent call reception history screen 52 (see FIG. 6B for example) and a calling screen 53 (see FIG. 4B for example) can be displayed on the LCD 16. In the displaying of the calling screen 53, etc., the MFP 1 of this embodiment displays information on each person (hereinafter referred to as "personal information") already registered (stored) in a telephone directory memory 14b (see FIG. 2) and an image including the person on the LCD 16 (details will be explained later).

A handset 22, which is provided on the side face of the MFP 1, is used when the user has a telephone conversation with the other party (user of an external device which is connected to the MFP 1 via the telephone circuit 100 (see FIG. 2)) by use of the telephone function. The handset 22 is placed on a holder having a hook (unshown) when no telephone conversation is going on. For a telephone conversation, the handset 22 is lifted from the holder and used. In this embodiment, the former state of the handset 22 is referred to as an "on-hook state" and the latter state is referred to as an "off-hook state". The handset 22 is electrically connected to an NCU (Network Control Unit) 23 (see FIG. 2) when it shifts to the off-hook state and the connection with the NCU 23 is released when it shifts to the on-hook state.

Figure 2:
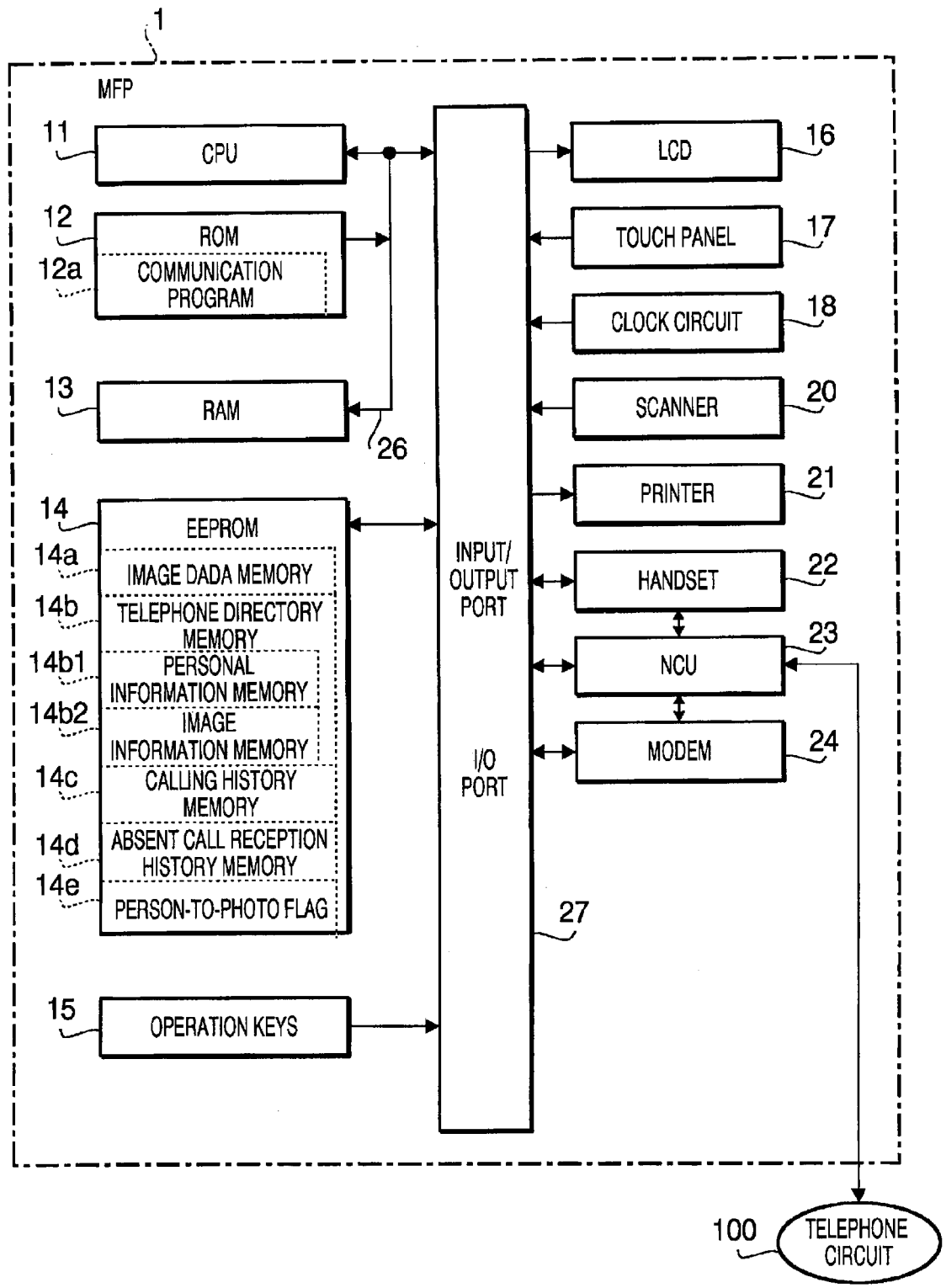
FIG. 2 is a block diagram showing an example of the electrical configuration of the MFP.

FIG. 2 is a block diagram showing an example of the electrical configuration of the MFP 1. The MFP 1 includes a CPU (Central Processing Unit) 11, a ROM (Read Only Memory) 12, a RAM (Random Access Memory) 13, an EEPROM (Electrically Erasable Programmable ROM) 14, the operation keys 15, the LCD 16, the touch panel 17, a clock circuit 18, the scanner 20, the printer 21, the handset 22, the NCU 23 and a modem 24 as its main components.

The CPU 11, the ROM 12 and the RAM 13 are connected together by a bus line 26. The EEPROM 14, the operation keys 15, the LCD 16, the touch panel 17, the clock circuit 18, the scanner 20, the printer 21, the handset 22, the NCU 23 and the modem 24 are connected to the bus line 26 via an I/O (Input/Output) port 27.

The CPU 11 controls the components connected to the I/O port 27 and the functions of the MFP 1 according to programs and data (fixed values) stored in the ROM 12 and the RAM 13 and various signals which are communicated via the NCU 23.

The ROM 12 stores a control program to be executed by the CPU 11 and fixed value data to be referred to during the execution of the control program. Incidentally, the ROM 12 has a storage area storing a communication program 12a for executing processes shown in flow charts of FIGS. 5 and 7 (explained later). By executing the processes according to the communication program 12a, the MFP 1 functions as a device capable of assisting the user to make effective use of the personal information associated with a photo and thereby facilitating the user's recognition of the other party (called party, calling party). The RAM 13 is a rewritable volatile memory for temporarily storing a variety of data during various operations of the MFP 1.

The EEPROM 14 is a nonvolatile memory capable of rewritably storing data and retaining its memory contents even after the power is shut down. As shown in FIG. 2, the EEPROM 14 includes an image data memory 14a, the telephone directory memory 14b, a calling history memory 14c, an absent call reception history memory 14d and a person-to-photo flag 14e.

The image data memory 14a is a storage area of the EEPROM 14 for storing image data. The image data memory 14a stores image data inputted from image pickup devices (e.g. digital camera), image data inputted from external devices (e.g. personal computer) connected to interfaces (unshown) of the MFP 1 via cables, image data read out from external media (SD Card®, Smart Media®, etc.) attached to media slots (unshown) of the MFP 1, image data of photos, etc. scanned by the scanner 20, etc.

The telephone directory memory 14b is a storage area of the EEPROM 14 for storing the so-called telephone directory. In the telephone directory, information specifying each called party (phone number, e-mail address, etc.) to be used for communication by use of the telephone function or the facsimile function is associated with information identifying the called party (name, address, etc.).

The MFP 1 of this embodiment is configured to let the user use images for the telephone directory. Thus, the telephone directory memory 14b includes a personal information memory 14b1 as a storage area for storing the personal information (name, phone number, etc.) and an image information memory 14b2 as a storage area for associating image data with the personal information stored in the personal information memory 14b1 as shown in FIG. 2. The configuration of the data stored in the personal information memory 14b1 and the image information memory 14b2 will be described later referring to FIGS. 3A-3C.

The calling history memory 14c is a storage area of the EEPROM 14 for storing history records of call origination (start of communication) made by the user by use of the telephone function of the MFP 1. Each history record stored in the calling history memory 14c (hereinafter referred to also as a "calling history record") includes the calling time (time of day of the call origination), information representing the called party (e.g. phone number), and information representing a photo (image) which was being displayed in a display area 53a of the calling screen 53 (see FIG. 4A) at the time of call origination.

The absent call reception history memory 14d is a storage area of the EEPROM 14 for storing history records of absent call reception (termination of a communication request received from outside (calling party) without starting communication). Each history record stored in the absent call reception history memory 14d (hereinafter referred to also as an "absent call reception history record") includes, for example, the time of day of the communication request and information representing the calling party (e.g. phone number) in cases where such information was acquired.

The person-to-photo flag 14e is a flag indicating whether or not the operation mode of the MFP 1 in a calling process (see FIG. 5) which will be explained later is a mode for extracting photos corresponding to personal information based on the personal information. When the person-to-photo flag 14e is ON, it means that the operation mode is a mode for extracting photos corresponding to personal information based on the personal information. On the other hand, when the person-to-photo flag 14e is OFF, it means that the operation mode is a mode for extracting personal information from a photo.

The clock circuit 18 is a well-known circuit having the clock function (keeping the current date and time). The NCU 23, which is connected to the telephone circuit 100, controls the transmission of the dialing signal to the telephone circuit 100, the response to the call signal from the telephone circuit 100, etc. The modem 24 modulates image data (specified for transmission by the facsimile function) into a signal that can be transmitted to the telephone circuit 100 and transmits the signal to the telephone circuit 100 via the NCU 23, while receiving a signal from the telephone circuit 100 via the NCU 23 and demodulating the received signal into image data that can be displayed by the LCD 16 or printed by the printer 21.

In the following, the configuration of the data stored in the personal information memory 14*b*1 and the image information memory 14*b*2 will be explained referring to FIGS. 3A-3C. FIG. 3A is a schematic diagram showing an example of the configuration of the data stored in the personal information memory 14*b*1. FIGS. 3B and 3C are schematic diagrams showing an example of the configuration of the data stored in the image information memory 14*b*2.

As shown in FIG. 3A, personal information PD (on each person who has been registered in the telephone directory) and a personal number P1 (capable of identifying each piece of personal information PD) are associated with each other in the personal information memory 14*b*1.

The personal information PD on a person includes information indicating a name P2 (as information indicating the name of the person as a calling/called party) and a phone number P3 (as information specifying the calling/called party), for example. Besides the name P2 and the phone number P3, the personal information PD includes additional information such as an address P4 (see FIG. 4B, etc.☐ and information indicating characteristics of the person. The information specifying the calling/called party may further include an e-mail address in addition to the phone number P3.

The personal number P1 is a number which is uniquely assigned to each person who has been registered in the telephone directory. The personal number P1 is stored in the personal information memory 14*b*1 as identification information for specifying the personal information PD on each person. While the personal numbers P1 are serial numbers starting from "1" in the example of FIG. 3A, the personal numbers P1 do not have to be serial numbers or start from "1" as long as the condition that each personal number P1 is uniquely assigned to each registered person is satisfied.

Meanwhile, in the image information memory 14*b*2, an image name Q1, area information Q2 and a personal number Q3 are associated together in regard to a piece of image data specified by the image name Q1 as shown in FIGS. 3B and 3C.

The image name Q1 is information specifying a piece of image data from all pieces of image data stored in the image data memory 14*a*. A file name, internal number, etc. which has been assigned to each piece of image data can be used as the image name Q1. Thus, a piece of image data stored in the image data memory 14*a* is specified by (the contents of) the image name Q1.

Thus, FIG. 3B shows the configuration of data stored in the image information memory 14*b*2 in regard to image data of a photo (image) "friends" stored in the image data memory 14*a*, and FIG. 3C shows the configuration of data stored in the image information memory 14*b*2 in regard to image data of a photo (image) "coworkers" stored in the image data memory 14*a*.

The area information Q2 is information representing an area which has been set in the drawing area of the image data specified by the image name Q1. The area information Q2 includes information indicating the shape of the area ("SHAPE"), information indicating the size of the area ("SIZE") and coordinate information specifying the position of the area in the image data ("X COORDINATE", "Y COORDINATE"). As the coordinate information, X-Y coordinates of the center of the area are used, for example.

The personal number Q3 is a number specifying a piece of personal information that is associated with the area specified by the area information Q2. The personal number Q3 is selected from the personal numbers P1 stored in the personal information memory 14*b*1 (FIG. 3A) and then stored in the image information memory 14*b*2. Thus, with the association between the personal number Q3 and the area specified by the area information Q2, the personal information PD corresponding to (associated with) the personal number Q3 (P1) in the personal information memory 14*b*1 is associated with the area specified by the area information Q2.

For example, in the case of FIG. 3B where the personal number "1" has been associated with an area whose "X COORDINATE", "Y COORDINATE", "SHAPE" and "SIZE" are (7, 5, ELLIPSE #2, 1.6) in the photo "friends", the personal information PD corresponding to the personal number "1" in the personal information memory 14*b*1 shown in FIG. 3A (i.e. the name P2 "JIRO SUZUKI" and the phone number P3 "520-xxx-1111") is associated with the area.

In the example of FIG. 3B, two more areas (other than the above area) have been set in the photo "friends", with which personal information PD specified by the personal number "2" (i.e. "TARO KATO", etc.) and personal information PD specified by the personal number "3" (i.e. "EISUKE KIMURA", etc.) have been associated, respectively. As above, the MFP 1 of this embodiment is configured so that multiple pieces of personal information PD can be associated with a piece of image data (image, photo).

Similarly, in the example of FIG. 3C, three areas have been set in the photo "coworkers", with which personal information PD specified by the personal number "1" (i.e. "JIRO SUZUKI", etc.), personal information PD specified by the personal number "4" (i.e. "SHINJI TAKAHASHI", etc.) and personal information PD specified by the personal number "5" (i.e. "DAISAKU SATO", etc.) have been associated, respectively.

In the example of FIGS. 3B and 3C, the personal information PD on the same person specified by the personal number "1" has been associated with both the photos "friends" and "coworkers". Since the MFP 1 of this embodiment is configured so that the personal information PD can be referred to from the personal information memory 14*b*1 by use of the personal number Q1 (personal number P1), it is unnecessary to store a piece of corresponding (associated) personal information for each piece of image data. Thus, wastage (useless consumption) of the storage area of the EEPROM 14 can be reduced even when the same personal information is associated with multiple pieces of image data.

Further, when it is necessary to associate the same personal information PD with two or more photos (images, image data), the association of the personal information PD with a latter photo (a photo (e.g. "coworkers") with which the personal information PD is associated later) can be carried out by use of (the same) personal information PD already associated with another (former) photo (e.g. "friends"), by which the CPU 11 is allowed to recognize the identity of the personal information PD associated with the photos. Therefore, the same personal information PD can be extracted from any of photos associated with the personal information PD, and all photos including (associated with) a certain piece of personal information PD can be extracted from the piece of personal information PD.

In the following, a case where the user makes a phone call to a person (called party) by use of the telephone directory stored in the telephone directory memory 14*b* will be explained referring to FIGS. 4A-4C and FIG. 5. First, the calling screen 53, which is displayed on the LCD 16 during the execution of a calling process (flow chart of FIG. 5), will be explained referring to FIGS. 4A-4C. FIGS. 4A-4C are schematic diagrams showing examples of the calling screen 53.

FIG. 4A shows a status of the calling screen 53 when the user selects a photo that includes desired personal information PD. The LCD 16 (calling screen 53) is divided into two (right and left) parts and a display area 53a capable of displaying a photo (image) is formed in the left-hand part, in which a photo selected by the user is displayed. Tabs 53b allowing the user to select a photo to be displayed in the display area 53a are displayed under the display area 53a. The user can get a desired photo (including an intended called party) displayed in the display area 53a by touching a tab 53b corresponding to the desired photo with a pointer (finger, stylus, etc.).

FIG. 4B shows a status of the calling screen 53 when an area (button in the photo currently displayed in the display area 53a) that has been associated with personal information PD on the intended called party has been touched by the user. When an area already associated with personal information PD (e.g. area 53c shown in FIG. 4B) is touched, the touched area (e.g. 53c) is highlighted (blinked) to let the area be distinguishable from other areas.

In the case where an area already associated with personal information PD (e.g. area 53c) is touched by the user, the personal information PD associated with the touched (selected) area is displayed in an area 53d on the right-hand side of the calling screen 53 currently displayed on the LCD 16, together with a dialing button 53e for dialing the phone number included in the personal information PD displayed in the area 53d.

FIG. 4C shows a status of the calling screen 53 when the person having the personal information PD currently displayed in the area 53d (i.e. the person associated with the area 53c in the photo currently displayed in the display area 53a) is determined as the called party and the dialing is carried out. As shown in FIG. 4C, the user can originate the call to the called party (associated with the selected area 53c) by touching the dialing button 53e being displayed in the area 53d together with the personal information PD.

As shown in FIGS. 4B and 4C, the MFP 1 of this embodiment displays the name P2, the phone number P3 and the address P4 (of the person as the called party) on the calling screen 53 (area 53d) as the personal information PD. Since additional information like the address P4 is displayed on the calling screen 53 in addition to the name P2 and the phone number P3, the user is allowed to recall and identify the called party with ease.

FIG. 4D shows a status of the calling screen 53 when a personal image 53f displayed in the area 53d is touched by the user when the MFP 1 is in the mode for extracting photos corresponding to personal information based on the personal information. As shown in FIG. 4D, the personal image 53f cut out from the area 53c is displayed in the area 53d on the right-hand side of the LCD 16.

In the mode for extracting photos corresponding to personal information based on the personal information, the user can make the MFP 1 extract photos corresponding to the personal image 53f currently displayed in the area 53d (i.e. photos that have been associated with the personal information PD currently displayed in the area 53d) by touching the personal image 53f, and make the MFP 1 display desired one of the extracted photos by selecting (touching) one of the tabs 53b under the display area 53a.

Figure 5:
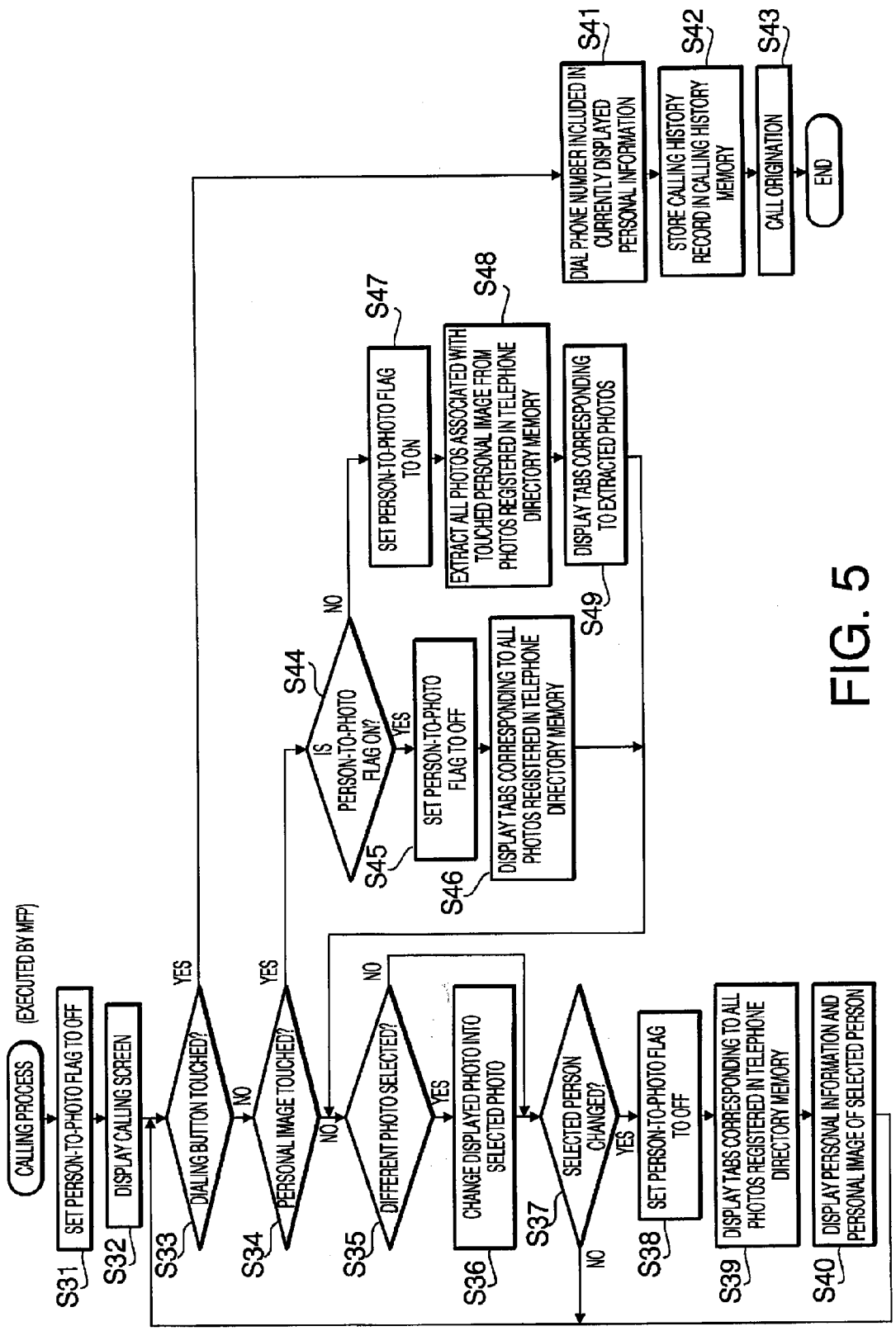
FIG. 5 is a flow chart showing the calling process executed by the MFP.

Next, the details of the calling process, for originating a call to a called party selected from the telephone directory, will be explained referring to FIG. 5. FIG. 5 is a flow chart showing the calling process which is executed by the MFP 1. The calling process is started when an instruction for selecting a telephone mode of the MFP 1 is inputted by the user.

At the start of the calling process, the MFP 1 sets the person-to-photo flag 14e to OFF (S31) and displays the calling screen 53 (see FIG. 4A) on the LCD 16 (S32). In this step, the MFP 1 displays a photo registered in the telephone directory memory 14b in the display area 53a of the calling screen 53 while also displaying the tabs 53b corresponding to all photos registered in the telephone directory memory 14b.

After the step S32, the MFP 1 checks whether the dialing button 53e on the calling screen 53 has been touched by the user (S33). When the dialing button 53e has not been touched (S33: NO), the MFP 1 checks whether the personal image 53f displayed in the area 53d has been touched by the user (S34). When the personal image 53f has not been touched (S34: NO), the MFP 1 advances to step S35.

On the other hand, when the personal image 53f has been touched (S34: YES), the MFP 1 checks whether the person-to-photo flag 14e is ON (S44). When the person-to-photo flag 14e is OFF (S44: NO), the MFP 1 sets the person-to-photo flag 14e to ON (S47), by which the operation mode is switched from the mode for extracting personal information from a photo to the mode for extracting photos corresponding to personal information based on the personal information.

After the step S47, the MFP 1 searches the telephone directory memory 14b and extracts all photos that have been associated with the personal image 53f touched by the user (i.e. associated with the personal information PD displayed in the area 53d) from all the photos registered in the telephone directory memory 14b (S48), displays the tabs 53b corresponding to the extracted photos (S49) and thereafter advances to the step S35.

The user can change the photo displayed in the display area 53a by operating (touching) a desired tab 53b. Thus, as a result of the steps S48 and S49, the user is allowed to make the MFP 1 display the photos (registered in the telephone directory memory 14b) associated with the personal image 53f (i.e. associated with the personal information PD displayed in the area 53d) one by one by properly operating the tabs 53b.

As above, a photo selected by the user by operating a tab 53b can be displayed in the whole display area 53a while being expanded throughout the display area 53a. Therefore, even when two or more photos have been extracted in S48, each of the extracted photos can be displayed in a style easily viewable to the user, which allows the user to acquire necessary information (e.g. personal connections including the called party corresponding to the personal image 53f) from the displayed photo with ease. Further, the tabs 53b (letting the user select a photo as needed) facilitate the user's selection of a photo and offer high usability to the user.

On the other hand, when the person-to-photo flag 14e is ON in S44 (S44: YES), the MFP 1 sets the person-to-photo flag 14e to OFF (S45), by which the operation mode is switched from the mode for extracting photos corresponding to personal information based on the personal information to the mode for extracting personal information from a photo. Thus, the operation mode is switched between the two modes each time the personal image 53f displayed in the area 53d is touched by the user.

After the step S45, the MFP 1 displays the tabs 53b corresponding to all the photos registered in the telephone directory memory 14b (S46) and thereafter advances to the step S35. Therefore, in the mode for extracting personal information from a photo, the user can make the MFP 1 extract already registered personal information PD from all the photos (any photo) registered in the telephone directory memory 14b.

In the step S35, the MFP 1 checks whether a different photo has been selected by the user as the photo to be displayed in the display area 53a, that is, whether a tab 53b of a photo other than the photo currently displayed in the display area 53a has been selected by the user.

When a different photo has been selected, that is, when the user intends to change the displayed photo (S35: YES), the MFP 1 changes the photo displayed in the display area 53a into the selected photo (S36) and thereafter advances to step S37. When no different photo has been selected in S35 (S35: NO), the MFP 1 advances to the step S37 while skipping the step S36.

In the step S37, the MFP 1 checks whether the selected person has been changed, that is, whether a different area (button) in the photo has been touched by the user. When the selected person has been changed (S37: YES), the MFP 1 sets the person-to-photo flag 14e to OFF (S38).

After the step S38, the MFP 1 displays the tabs 53b corresponding to all the photos registered in the telephone directory memory 14b (S39). Subsequently, the MFP 1 reads out personal information PD on the currently selected person (i.e. personal information PD associated with the selected area) from the telephone directory memory 14b (personal information memory 14b1, image information memory 14b2) and displays the personal information PD in the area 53d of the calling screen 53 while also displaying a personal image (e.g. the personal image 53f in FIG. 4D) cut out from the touched area (e.g. the area 53c in FIG. 4C) in the area 53d (S40). Thereafter, the MFP 1 returns to the step S33.

On the other hand, when the selected person has not been changed in S37, that is, when no other area in the photo has been touched by the user (S37: NO), the MFP 1 directly returns to the step S33.

When the dialing button 53e has been touched by the user in S33 (S33: NO), the MFP 1 dials the phone number P3 included in the personal information PD currently displayed in the area 53d (i.e. personal information PD associated with the area 53c selected by the user) (S41). Subsequently, the MFP 1 stores the calling time (time of day of the call origination), the phone number (as the information representing the called party) and information representing the photo currently displayed in the display area 53a (at the time of call origination) in the calling history memory 14c as a calling history record (S42), starts the call origination (S43), and ends the calling process of FIG. 5.

As described above, in the calling process executed by the MFP 1 of this embodiment, the user is allowed to determine the called party while referring to a photo (image) displayed on the LCD 16 (specifically, in the display area 53a of the calling screen 53). Since the selection input of the called party can be made based on the photo displayed on the LCD 16, the user starting the communication can select a person who is suggested by the photo as a called party, by which the user is allowed to start the communication after having a good grasp of information on the called party.

Further, since all photos that have been associated with the touched personal image 53f (i.e. associated with the personal information PD displayed in the area 53d) can be searched for and extracted, a lot of information on the called party can be acquired with ease, by which the user is allowed to gain a detailed grasp of the called party. In the search for photos that have been associated with a piece of personal information PD, the personal image 53f can be used as a search start button, which offers high usability to the user. Furthermore, since the user can conduct the search while viewing the personal image 53f representing a piece of personal information PD, the user conducting the search can intuitively recognize the called party (target of the search).

Incidentally, while the above calling process (FIG. 5) has been assumed to be started when the instruction for selecting the telephone mode is inputted by the user, the calling process of FIG. 5 can also be applied to cases where a call is originated by the user from the absent call reception history screen 52 (see FIGS. 6B and 6C) which will be explained later. For example, when an instruction for displaying the absent call reception history screen 52 on the LCD 16 is inputted by the user, the MFP 1 in the step S32 displays the absent call reception history screen 52 on the LCD 16 instead of the calling screen 53.

The calling process of FIG. 5 (which has been assumed to be started when the instruction for selecting the telephone mode (telephone function) is inputted by the user) can similarly be applied to cases where an instruction for selecting a facsimile transmission mode (facsimile function) is inputted by the user.

Figure 6A:
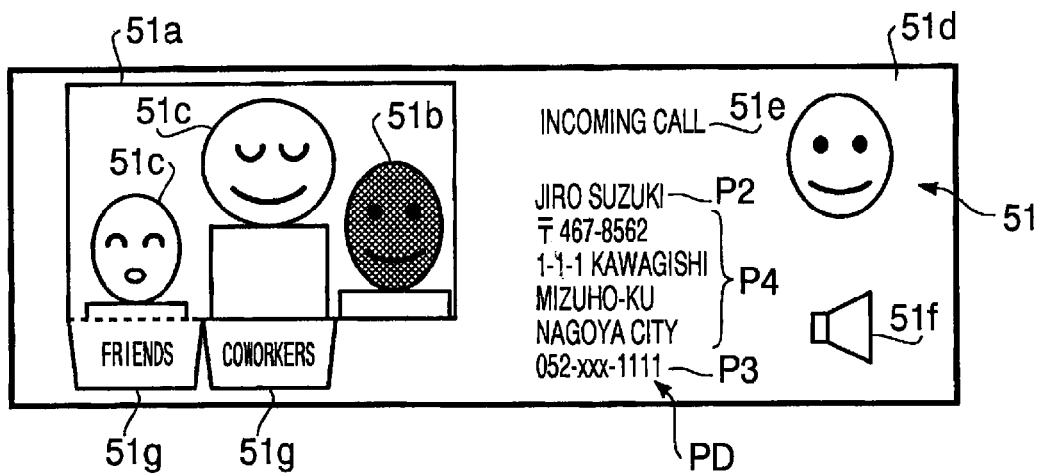
FIGS. 6A-6C are schematic diagrams showing examples of screens which are displayed on the LCD during the execution of a call reception process.
Figure 6B:
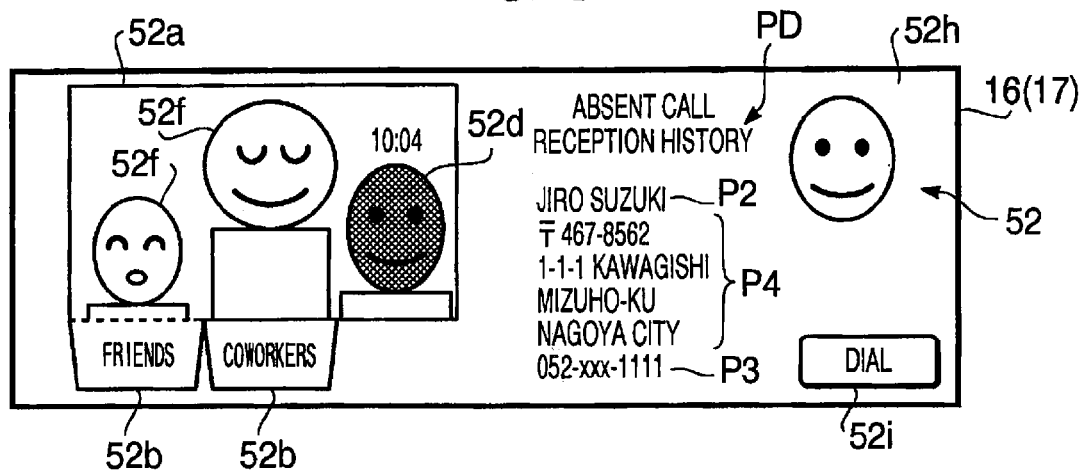
Figure 6C:
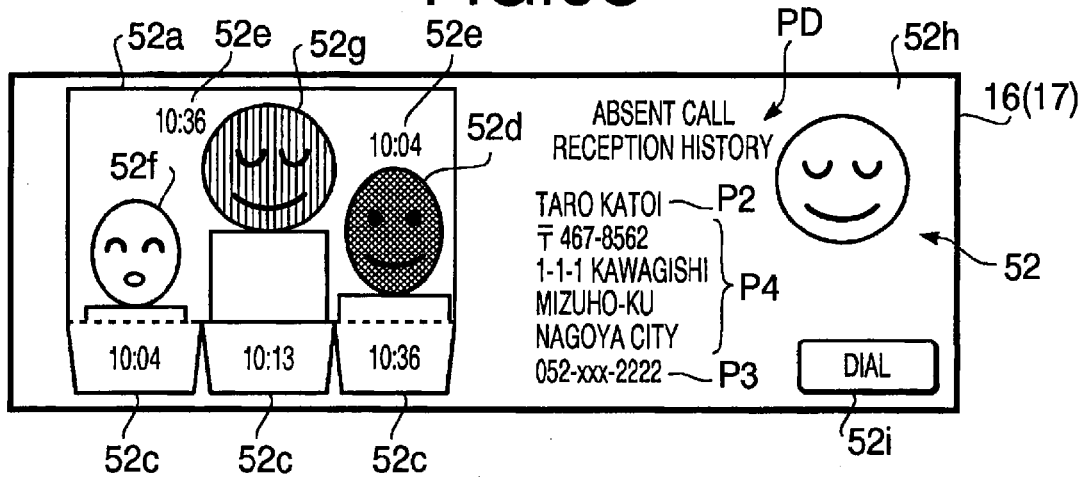

In the following, a case where the MFP 1 (receiving a phone call) informs the user of the calling party (sending a communication request) by use of a photo already stored (registered) in the telephone directory memory 14b will be explained referring to FIGS. 6A-6C and FIG. 7. First, screens which are displayed on the LCD 16 during the execution of a call reception process (flow chart of FIG. 7) will be explained referring to FIGS. 6A-6C. FIGS. 6A-6C are schematic diagrams showing examples of the screens displayed on the LCD 16 during the execution of the call reception process (FIG. 7) which will be explained later.

FIG. 6A shows an example of the call reception screen 51 which is displayed on the LCD 16 when a communication request (incoming call) is received by the MFP 1. As shown in FIG. 6A, the LCD 16 (call reception screen 51) is divided into two (right and left) parts and a display area 51a capable of displaying a photo (image) is formed in the left-hand part.

Figure 7:
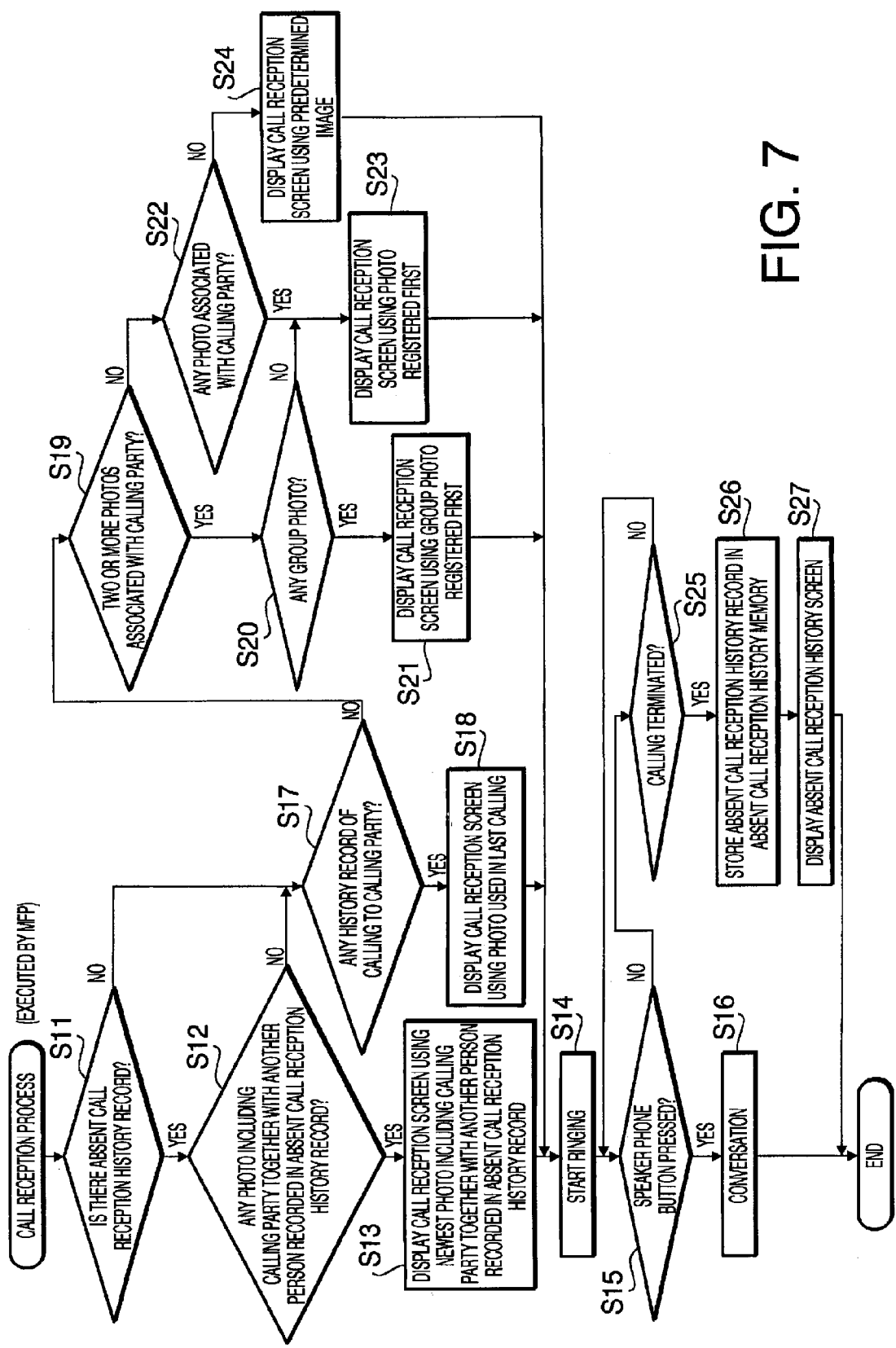
FIG. 7 is a flow chart showing the call reception process executed by the MFP.

In the case where a communication request is received, a photo that is selected according to preset rules is displayed on the LCD 16 in the call reception process of FIG. 7 (details will be explained later). In this case, if the calling party (sender of the communication request) is a person already stored (registered) in the telephone directory memory 14b, an area (in the displayed photo) corresponding to (associated with the personal information PD on) the calling party (e.g. area 51b) is highlighted (blinked) to let the area be distinguishable from other areas 51c with which personal information PD has been associated.

As above, when a photo is displayed in (outputted to) the display area 51a, the area 51b corresponding to the calling party sending the communication request is differentiated from other areas 51c (with which personal information PD has been associated) by changing the display style, by which the user is allowed to easily identify the calling party.

Further, a message 51e saying "INCOMING CALL" and a speaker phone button 51f (for requesting line connection) are displayed in an area 51d on the right-hand side of the call reception screen 51 displayed on the LCD 16. If the calling party (sender of the communication request) has already been stored (registered) in the telephone directory memory 14b, the personal information PD on the calling party is also displayed in the area 51d. When the speaker phone button 51f on the call reception screen 51 is touched by the user, the line is connected, by which the communication with the calling party is made possible.

As above, when there is an incoming call, a photo including the calling party sending the communication request and the personal information PD on the calling party are displayed on the LCD 16 at the same time. Therefore, direct information on the calling party can be acquired from the personal information PD while also acquiring indirect information on the calling party (e.g. personal connections including the calling party) from the corresponding photo, which allows the user to correctly recognize the calling party with ease.

Further, the name P2, the phone number P3 and the address P4 of the calling party are displayed on the call reception screen 51 (area 51*d*) as the personal information PD as shown in FIG. 6A. Since additional information like the address P4 is displayed on the call reception screen 51 in addition to the name P2 and the phone number P3, the user is allowed to recall and identify the calling party with greater ease.

Incidentally, when there are two or more photos including the calling party, two or more tabs 51*g* (inscribed with the photo names of the photos including the calling party) are displayed so as to let the user select and change the photo displayed in the display area 51*a*. Therefore, the user can start the telephone conversation with the calling party after having a good grasp of information on the calling party by properly changing the photo displayed in the display area 51*a* (i.e. by properly touching the tabs 51*g*).

FIGS. 6B and 6C show examples of the absent call reception history screen 52 which indicates the status of the absent call reception history. Specifically, FIG. 6B shows a case where only one absent call reception history record has been stored in the absent call reception history memory 14*d* and FIG. 6C shows a case where two or more absent call reception history records have been stored in the absent call reception history memory 14*d*.

As shown in FIGS. 6B and 6C, a display area 52*a* capable of displaying a photo (image) is formed on the left-hand side of the absent call reception history screen 52 displayed on the LCD 16. Under the display area 52*a*, tabs 52*b* (in FIG. 6B) or tabs 52*c* (in FIG. 6C) are displayed. The user can select the photo to be displayed in the display area 52*a* by touching one of the tabs.

In the case of FIG. 6B where there is only one absent call reception history record, a photo name is inscribed on each tab 52*b*. In the case of FIG. 10C where there are two or more absent call reception history records, call reception time (time of day of call reception) is inscribed on each tab 52*c*.

As shown in FIG. 6B, when there are two or more photos including the calling party recorded in the only one absent call reception history record, two or more tabs 52*b* inscribed with the photo names of the photos are displayed. When there are two or more absent call reception history records as shown in FIG. 6C, each tab 52*c* is associated with each call reception time. Incidentally, when there exists a photo that includes two or more calling parties recorded in the absent call reception history records, two or more tabs 52*c* are associated with one photo as shown in FIG. 6C.

The user can change the photo displayed in the display area 52*a* by properly touching the tabs 52*b* or 52*c*. Thus, even when there are two or more photos to be displayed due to the existence of two or more absent call reception history records or when there are two or more photos including the calling party recorded in only one absent call reception history record, the user can make the MFP 1 display a desired one of the photos in the display area 52*a* by operating (touching) the tabs 52*b* or 52*c*.

When a photo is displayed in the display area 52*a* of the absent call reception history screen 52 as shown in FIG. 6B, the area 52*d* corresponding to the calling party recorded in the (only one) absent call reception history record is highlighted (blinked) to let the area be distinguishable from other areas 52*f* with which personal information PD has been associated, and the call reception time 52*e* is displayed in the vicinity of the area 52*d*.

As above, when there is an absent call reception history record, the area 52*d* (in the photo displayed in the display area 52*a*) corresponding to the calling party recorded in the absent call reception history record is displayed in a display style different from that of other areas 52*f* with which personal information PD has been associated, by which the user is allowed to easily identify the calling party recorded in the absent call reception history record.

Further, when there are absent call reception history records regarding two or more calling parties, areas (52*d*, 52*g*) corresponding to calling parties recorded in absent call reception history records are highlighted (blinked) to let the areas (52*d*, 52*g*) be distinguishable from other areas 52*f* with which personal information PD has been associated, while displaying the areas 52*d* and 52*g* in display styles distinguishable from each other (differing in the blinking interval, blinking color, etc.) as shown in FIG. 6C. In the vicinity of each of the areas 52*d* and 52*g*, the call reception time 52*e* is displayed.

Furthermore, in the case where there are two or more absent call reception history records as shown in FIG. 6C, a photo associated with personal information PD on the calling party recorded in the latest absent call reception history record is displayed preferentially. Thus, when the display on the LCD 16 has just been switched to the absent call reception history screen 52 from the call reception screen 51 (or from a different screen according to a user operation), the user can recognize the latest calling party (who sent the latest communication request) from the absent call reception history screen 52 on which the photo including the latest calling party is preferentially displayed in the display area 52*a*.

Since the areas 52*d* and 52*g* corresponding to calling parties recorded in absent call reception history records are displayed in one photo in display styles distinguishable from each other, the user can learn from one photo that there are two or more absent call reception history records, while also intuitively recognizing the relationship between the calling parties from the photo outputted to the display area 52*a*.

Meanwhile, in an area 52*h* on the right-hand side of the absent call reception history screen 52 displayed on the LCD 16, personal information PD representing a calling party is displayed. When there are two or more absent call reception history records, personal information PD on the latest calling party (recorded in the latest absent call reception history record) or personal information PD associated with a photo and area selected by the user is displayed in the area 52*h*.

The area 52*h* includes a dialing button 52*i* for dialing the phone number included in the personal information PD displayed in the area 52*h*. The user can originate a call to the "calling party" (whose personal information PD is currently displayed in the area 52*h*) by touching the dialing button 52*i* being displayed in the area 52*h* together with the personal information PD. Thus, the user can carry out the call origination (reply call) after having a good grasp of information on the "calling party" (recorded in the absent call reception history record) based on the photo displayed in the display area 52*a*.

Also on the absent call reception history screen 52 (area 52*h*), the name P2, the phone number P3 and the address P4 of the calling party are displayed as the personal information PD as shown in FIGS. 6B and 6C. Since additional information like the address P4 is displayed on the absent call reception history screen 52 in addition to the name P2 and the phone number P3, the user is allowed to recall and identify the calling party recorded in the absent call reception history record with greater ease.

Since a photo including the calling party recorded in the absent call reception history record and the personal information PD on the calling party are displayed on the LCD 16 at the same time, direct information on the calling party recorded in the absent call reception history record can be acquired from the personal information PD while also acquiring indirect information on the calling party (e.g. personal connections including the calling party) from the corresponding photo, which allows the user to correctly recognize the calling party (recorded in the absent call reception history record) with ease.

Next, the details of the call reception process, which is executed by the MFP 1 in response to a communication request, will be explained referring to FIG. 7. FIG. 7 is a flow chart showing the call reception process which is executed by the MFP 1. The call reception process is started when a communication request is received from (a communication device of) a calling party. At the start of the call reception process, the MFP 1 checks whether there exists an absent call reception history record which has been stored in the absent call reception history memory 14d (S11).

When there exists an absent call reception history record (S11: YES), the MFP 1 checks whether a photo including the calling party (sender of the communication request) together with another person who has been recorded in an absent call reception history record has been registered in the telephone directory memory 14b (image information memory 14b2) (S12).

When a photo including the calling party together with another person recorded in an absent call reception history record has been registered in the telephone directory memory 14b (S12: YES), the MFP 1 displays the call reception screen 51 on the LCD 16 by use of the photo (including the calling party and another person recorded in an absent call reception history record) (S13). In the photo displayed in the display area 51a of the call reception screen 51, an area associated with the calling party is highlighted (blinked) to let the area be distinguishable from other areas (see FIG. 6A).

When no absent call reception history record has been stored in the absent call reception history memory 14d in S11 (S11: NO) or when no photo, including the calling party together with another person recorded in an absent call reception history record, has been registered in the telephone directory memory 14b in S12 (S12: NO), the MFP 1 checks whether a calling history record indicating a calling to the calling party (sender of the communication request) has been stored in the calling history memory 14c (S17).

When there exists such a calling history record in the calling history memory 14c (S17: YES), the MFP 1 displays the call reception screen 51 on the LCD 16 by use of a photo that was used in the last calling (latest calling) among such calling history records stored in the calling history memory 14c (S18). In the photo displayed in the display area 51a of the call reception screen 51, an area associated with the calling party is highlighted (blinked) to let the area be distinguishable from other areas (see FIG. 6A).

On the other hand, when no such calling history record (indicating a calling to the calling party sending the communication request) exists in the calling history memory 14c in S17 (S17: NO), the MFP 1 checks whether there are two or more photos associated with the calling party in the telephone directory memory 14b (image information memory 14b2) (S119).

When there are two or more photos associated with the calling party (S19: YES), the MFP 1 checks whether a group photo (including two or more people as subjects) is included in the photos associated with the calling party (S20).

When the photos associated with the calling party include one or more group photos (S20: YES), the MFP 1 displays the call reception screen 51 on the LCD 16 by use of one of the group photos that was stored (registered) in the telephone directory memory 14b first (S21). In the photo displayed in the display area 51a of the call reception screen 51, an area associated with the calling party is highlighted (blinked) to let the area be distinguishable from other areas (see FIG. 6A).

On the other hand, when no group photo is included in the photos associated with the calling party (S20: NO), the MFP 1 displays the call reception screen 51 on the LCD 16 by use of one of the photos (associated with the calling party) that was stored in the telephone directory memory 14b first (S23). In the photo displayed in the display area 51a, an area associated with the calling party is highlighted (blinked) to let the area be distinguishable from other areas (see FIG. 6A).

When there are not two or more photos associated with the calling party in S19 (S19: NO), the MFP 1 checks whether there exists a photo associated with the calling party in the telephone directory memory 14b (S22).

When there exists a photo associated with the calling party in the telephone directory memory 14b (S22: YES), the MFP 1 displays the call reception screen 51 on the LCD 16 by use of the photo (only one photo associated with the calling party) which was stored in the telephone directory memory 14b first (S23). In the photo displayed in the display area 51a, an area associated with the calling party is highlighted (blinked) to let the area be distinguishable from other areas (see FIG. 6A).

On the other hand, when no photo associated with the calling party exists in the telephone directory memory 14b (S22: NO), the MFP 1 displays the call reception screen 51 on the LCD 16 by use of an image which has been predetermined irrespective of the calling party (e.g. an image including a human-shaped icon and a character string "NO DATA") (S24).

After finishing the step S13, S18, S21, S23 or S24, the MFP 1 starts ringing (S14) and then checks whether the speaker phone button 51f has been touched or not (S15). When the speaker phone button 51f has been touched (S15: YES), the MFP 1 enables the telephone conversation by connecting the line (S16) and ends the call reception process of FIG. 7.

When the speaker phone button 51f has not been touched in S15 (S15: NO), the MFP 1 checks whether the calling (communication request) from the calling party has terminated or not (S25).

When the calling from the calling party has not terminated (S25: NO), the MFP 1 returns to the step S15. When the calling has terminated (S25: YES), the MFP 1 stores communication request time (time of day of the reception of the communication request) and the phone number of the calling party (as information representing the calling party) in the absent call reception history memory 14d as an absent call reception history record (S26).

Subsequently, the MFP 1 displays the absent call reception history screen 52 on the LCD 16 instead of the call reception screen 51 (S27) and ends the call reception process of FIG. 7. In this case where the absent call reception history screen 52 is displayed on the LCD 16 (S27), the photo (image) to be displayed in the display area 52a first is selected according to the same rules as the aforementioned steps S11-S13 and S17-S24.

As explained above, with the MFP 1 in accordance with the first embodiment of the present invention, all photos (images)

that have been associated with the personal image 53f displayed in the area 53d of the calling screen 53 (i.e. associated with the personal information PD displayed in the area 53d) can be searched for and extracted. When two or more photos are extracted by the search, additional information that can not be acquired from one photo (e.g. personal connections including the called party corresponding to the personal image 53f) can be acquired, which allows the user to obtain a lot of information and gain a detailed grasp of the called party with ease.

When an area (in the photo displayed in the display area 53a of the calling screen 53) associated with personal information PD is specified (touched) by the user, the personal information PD is displayed in the area 53d together with the personal image 53f, by which the search for a photo is facilitated since the user can search for a desired photo while understanding the contents of the personal information PD.

In the MFP 1 of the first embodiment, the selection of personal information PD as the search target (i.e. specification of a corresponding area (e.g. area 53c) in the photo displayed in the display area 53a) and the determination of the personal information PD as the search target (i.e. specification of a corresponding personal image (e.g. personal image 53f) displayed in the area 53d) can be made through the touch panel 17, which allows the user to search for photos (image) with easy operation.

Further, since the MFP 1 of the first embodiment is configured so that the personal information PD can be referred to from the personal information memory 14b1 by use of the personal number Q1 (personal number P1), the search for a photo (image) based on the personal information PD can be realized while reducing wastage (useless consumption) of the storage area of the EEPROM 14 (even when the same personal information is associated with multiple pieces of image data).

<Embodiment 2>

Figure 8:
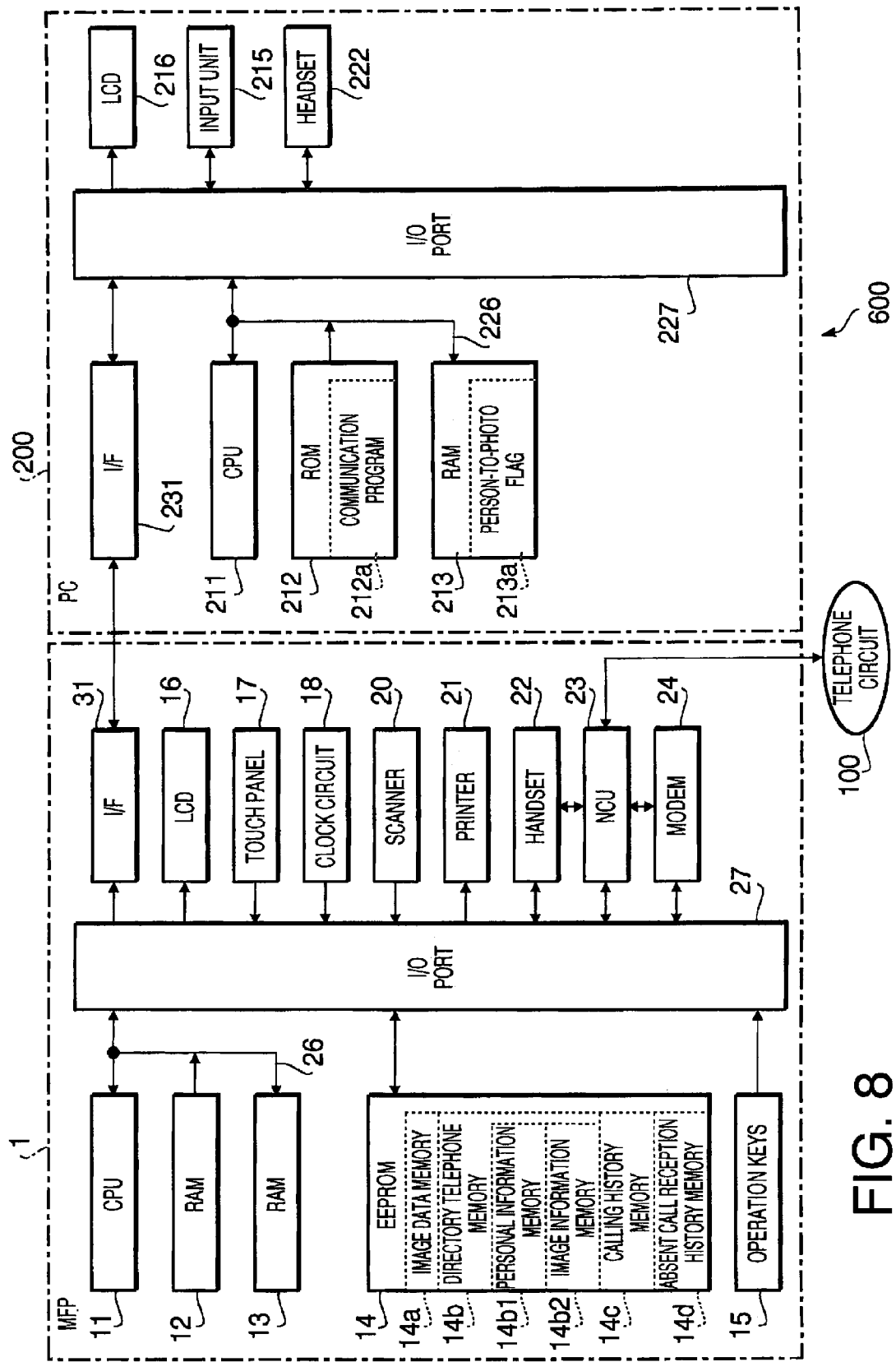
FIG. 8 is a block diagram showing the electrical configuration of a communication system as an image information processing system in accordance with a second embodiment of the present invention.

FIG. 8 is a block diagram showing the electrical configuration of a communication system 500 as an image information processing system in accordance with a second embodiment of the present invention. While the user in the first embodiment carries out communication via the telephone circuit 100 (telephone conversation, FAX communication) by operating the MFP 1, the user in the second embodiment carries out the communication via the telephone circuit 100 by operating a PC (Personal Computer) 200 which is connected to the MFP 1. In the following explanation of the communication system 500, components identical with those in the first embodiment are assigned the same reference characters as those in the first embodiment and repeated explanation thereof is omitted for brevity.

As shown in FIG. 8, the communication system 500 is made up of the MFP 1 and the PC 200, which are connected together via an I/F (interface) 31 of the MFP 1, a communication cable and an I/F 231 of the PC 200.

The MFP 1 in the second embodiment has substantially the same electrical configuration as that in the first embodiment except that the I/F 31 is added and the communication program 12a (for the execution of the flow charts of FIGS. 5 and 7) and the person-to-photo flag 14e are left out.

The PC 200 includes a CPU 211, a ROM 212, a RAM 213, an input unit 215, an LCD 216 and a headset 222 (headphones with a microphone integrated therewith) as its main components. The CPU 211, the ROM 212 and the RAM 213 are connected together by a bus line 226. The input unit 215, the LCD 216 and the headset 222 are connected to the bus line 226 via an I/O port 227.

The CPU 211 controls the components connected to the I/O port 227 and the functions of the PC 200 according to programs and data (fixed values) stored in the ROM 212 and the RAM 213 and various signals which are communicated via an NCU 223.

The ROM 212 stores a control program to be executed by the CPU 211 and fixed value data to be referred to during the execution of the control program. The ROM 212 has a storage area storing a communication program 212a. The communication program 212a is a program for executing processes corresponding to the calling process (FIG. 5) and the call reception process (FIG. 7) executed by the MFP 1 in the first embodiment.

The RAM 213 is a rewritable volatile memory for temporarily storing a variety of data during various operations of the PC 200. The RAM 213 stores a person-to-photo flag 213a which is similar to the person-to-photo flag 14e in the first embodiment. The person-to-photo flag 213a is a flag indicating whether the operation mode (when the PC 200 executes the process corresponding to the calling process (FIG. 5) executed by the MFP 1 in the first embodiment) is the mode for extracting photos corresponding to personal information based on the personal information or not.

The input unit 215 is a unit for letting the user input information and instructions to the PC 200, which can include a keyboard and a mouse, for example. The input unit 215 may also be implemented as a touch panel which is formed integrally with the LCD 216.

In the second embodiment, the processes corresponding to the calling process (FIG. 5) and the call reception process (FIG. 7) are executed by the PC 200. Specifically, in the call reception process, etc. in the second embodiment, each screen (51-53) is displayed on the LCD 216 of the PC 200, and each instruction (for specifying an area, etc.) is inputted by the user by operating the input unit 215 instead of touching the screen with a pointer (finger, stylus, etc.). Incidentally, the photo to be displayed on each screen (51-53) is read out from the image data memory 14a of the MFP 1 depending on the contents of the telephone directory memory 14b.

With the above communication system 500 in accordance with the second embodiment of the present invention, all photos (images) that have been associated with a specified piece of personal information PD can be searched for and extracted similarly to the MFP 1 of the first embodiment. Thus, the communication system 500 of this embodiment has the same advantages as the MFP 1 of the first embodiment.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while a personal image (e.g. personal image 53f in FIG. 4D) is displayed in the area 53d of the calling screen 53 when an area (in the photo displayed in the display area 53a of the calling screen 53) associated with personal information PD (e.g. area 53c in FIG. 4C) is touched (or specified, ditto for the following description) by the user and all photos that have been associated with the personal image (i.e. associated with the personal information PD currently displayed on the LCD (16, 216)) are searched for and extracted when the personal image is touched by the user in the above embodiments, it is possible to leave out the displaying of the personal image and the personal information PD. In this case, when an area (in the photo displayed in the display area 53a of the calling screen 53) associated with personal information PD (e.g. area 53c in FIG. 4C) is touched by the user, all photos that have been associated with the personal information PD corresponding to (associated with) the touched area are searched for and extracted without displaying the personal image (e.g. personal image 53f in FIG. 4D) or the personal information PD in the area 53d of the calling screen 53.

While all photos that have been associated with the personal information PD (represented by the personal image 53f displayed in the area 53d of the calling screen 53) are searched for and extracted when the personal image 53f is touched by the user in the above embodiments, it is also possible to search for and extract all photos that have been associated with the personal information PD when the area 53d (in which the personal information PD is currently displayed) is touched by the user.

In this case, when an area (in the photo displayed in the display area 53a of the calling screen 53) associated with personal information PD is touched by the user, it is possible to leave out the displaying of the personal image 53f (corresponding to the personal information PD) while displaying the personal information PD in the area 53d.

While the personal image 53f in the above embodiments (functioning as a button as the trigger for searching for and extracting all photos that have been associated with the personal information PD) is an image cut out from the area in the currently displayed photo touched by the user, it is also possible to display a different image, such as an image of a face, character, etc. (previously stored (registered) in the telephone directory memory 14b (or in a telephone directory memory 140b which will be explained later) as a part of the personal information PD), the name P2, the phone number P3 or the address P4, in the area 53d as a button having the same function as the personal image 53f.

While the tabs 53b corresponding to the photos extracted in the step S48 are displayed on the LCD (16, 216) in the step S49 in the calling process (FIG. 5) in the above embodiments, the result of the photo search can be displayed in various different ways. For example, it is possible to display photo names of the extracted photos in the display area 53a so that the photos extracted as the result of the search can be read out (called up).

While the search for (extraction of) all photos associated with personal information PD associated with an area in a photo currently displayed in a display area is executed for the display area 53a of the calling screen 53 in the above embodiments, the photo search (extraction) may also be executed similarly for the display area 51a of the call reception screen 51 and the display area 52a of the absent call reception history screen 52.

In the above embodiments, an area in the displayed photo corresponding to the other party (calling party, called party) is highlighted on the call reception screen 51, the absent call reception history screen 52, the calling screen 53, etc. by displaying the area in a specific display style (e.g. blinking) distinguishable from the other areas. The display style for making the area (corresponding to the other party) distinguishable from the other areas can include a wide variety of styles (blinking, coloring, high-brightness display, etc.).

In cases where a photo including both the calling party (sending a communication request) and a different person already recorded in an absent call reception history record in the absent call reception history memory 14d is displayed on the call reception screen 51, the area associated with the calling party and the area associated with the different person (recorded in an absent call reception history record) may be displayed in different display styles. With such a display method, the amount of information regarding the calling party sending the communication request is increased (by comparison between the area associated with the calling party and the area associated with the different person recorded in an absent call reception history record), which allows the user to deepen his/her understanding of the calling party.

While the LCD (16, 216) is divided into two (right and left) parts and a display area (display area 51a, etc.) capable of displaying a photo is formed in the left-hand part while forming an area (area 51d, etc.) capable of displaying the personal information PD in the right-hand part in the above embodiments, the number of divisions is not restricted to two; the LCD may be divided into more areas to display various kinds of information. With such a configuration, the amount of information displayed on the LCD can be increased and the user is allowed to further deepen his/her understanding of the other party (calling party, called party).

While an area which has been set in a photo is specified (selected) by the user by touching the area in the photo displayed on the LCD 16 (formed integrally with the touch panel 17) in the first embodiment, the specification (selection) of an area set in a photo may also be made by use of a cursor, pointer, etc. which can be moved on the photo displayed on the LCD 16 by operating the operation keys 15, etc.

While the user is allowed to refer to multiple photos corresponding to (associated with) a piece of personal information PD by specifying the piece of personal information PD, it is also possible to let the user refer to a piece of personal information PD that is common to multiple photos (by associating common personal information PD with multiple photos). With the possibility of referring to personal information PD common to multiple photos, the user can acquire additional information (which can not be acquired from one photo alone) with ease.

While personal information PD (information on a person) is associated with a photo in the above embodiments, the information associated with a photo is not restricted to personal information PD; a variety of necessary information (e.g. information on a device, object, natural object, etc. included in the photo) may be associated with the photo. Further, the target with which the personal information PD is associated is not restricted to a photo; the personal information PD may also be associated with various types of image data (e.g. graphics of a painting, a character, etc.).

While a person (face) included in a photo is set as an area to be associated with personal information PD in the above embodiments, the area set in a photo is not restricted to a person; an arbitrary area in a photo can be set as an area to be associated with personal information PD.

While a piece of personal information PD is associated with an area in the above embodiments, two or more pieces of personal information PD may be associated with an area. For example, when a house is included in a photo as a subject, it is possible to set the house as an area and associate multiple pieces of personal information PD (on all family members living in the house, for example) with the area.

In the above embodiments, the telephone directory memory 14b is made up of the personal information memory 14b1 (storing the personal information PD) and the image information memory 14b2 (storing the image name Q1 and the personal number P1 corresponding to the personal information PD stored in the personal information memory 14b1). With such a data configuration, wastage (useless consumption) of the storage area of the EEPROM 14 can be reduced even when the same personal information is associated with multiple pieces of image data.

However, the data configuration of the telephone directory memory is not restricted to the above configuration. FIGS. 9A and 9B are schematic diagrams showing an example of the configuration of data stored in a telephone directory memory 140b as a modification of the telephone directory memory 14b.

As shown in FIGS. 9A and 9B, the telephone directory memory 140b is configured to be capable of storing area information R2, personal information PD (including a name R3, phone number R4, address (unshown), etc.) and a personal number R5 for each piece of image data which is specified by an image name R1.

When a piece of personal information PD is associated with a photo (e.g. "friends") for the first time, the personal information PD is stored in a data area of the telephone directory memory 140b associated with the image data (photo) specified by the image name R1 "friends", for example (as shown in the line L1 in FIG. 9A).

On the other hand, when a piece of personal information PD that should be associated with a photo (e.g. "coworkers") has already been associated with a different photo (e.g. "friends"), the personal information PD is not stored in a data area of the telephone directory memory 140b associated with the image data (photo) specified by the image name R1 "coworkers", as shown in the line L2 in FIG. 9B. However, the personal information PD can be referred to in a data area of the telephone directory memory 140b associated with the image data (photo) specified by the image name R1 "friends", by use of the personal number "A1" (personal number R5 in the line L2).

As above, also with the data configuration shown in FIGS. 9A and 9B, wastage (useless consumption) of the storage area of the EEPROM 14 can be reduced even when the same personal information is associated with multiple pieces of image data.

While the personal information PD, the area information Q2, etc. are stored in the telephone directory memory 14b separately from the image data stored in the image data memory 14a in the above embodiments, it is also possible to store the personal information PD, the area information Q2, etc. in the header of the image data. In cases where the same personal information is associated with multiple pieces of image data, personal information PD already associated with a different piece of image data can be referred to by use of identification information such as the personal number P1.

In the aforementioned call reception process (FIG. 7), when there are two or more photos associated with the calling party sending the communication request (S19: YES), whether a group photo is included in the photos (associated with the calling party) or not is checked (S20) in the above embodiments. However, it is also possible to leave out the step S20 and display one of the photos (associated with the calling party) that was registered in the telephone directory memory 14b first (irrespective of whether the photo is a group photo or not) on the call reception screen 51 when there are two or more photos associated with the calling party.

While the image data memory 14a, the telephone directory memory 14b (personal information memory 14b1, image information memory 14b2), the calling history memory 14c and the absent call reception history memory 14d are formed in the MFP 1 in the communication system 500 of the second embodiment, part or all of memory corresponding to the memories 14a-14d may be formed in the RAM 213 of the PC 200.

What is claimed is:

1. An image information storage device, comprising:
   an image data storage unit which stores first image data;
   a registration information storage unit which stores prescribed registration information while associating the registration information with the first image data stored in the image data storage unit, the registration information storage unit storing registration information for area information representing an area selected from one or more areas set in a drawing area of a piece of first image data stored in the image data storage unit;
   a search unit which conducts a search, when an input for specifying an area represented by area information is made while an image represented by a piece of first image data stored in the image data storage unit is displayed on a display screen, for second image data associated with registration information based on the registration information associated with the area information representing the specified area; and
   an output control unit which controls output of a menu image to the display screen while outputting an image represented by the second image data, which is searched by the search unit, to the display screen,
   wherein:
      when the search by the search unit finds that multiple pieces of second image data associated with the registration information have been stored in the image data storage unit, the output control unit outputs an image represented by one of the multiple pieces of second image data to the display screen while also outputting the menu image, for letting a user select one of a plurality of images represented by the multiple pieces of second image data, to the display screen, and
      when an input for selecting one of the plurality of images is made by the user via the display screen, the output control unit switches the image outputted to the display screen to the selected image.

2. The image information storage device according to claim 1, wherein when the input for specifying an area represented by area information is made while an image represented by a piece of first image data stored in the image data storage unit is displayed on the display screen, the output control unit outputs the registration information, which has been stored in the registration information storage unit while being associated with the area information representing the specified area, to the display screen.

3. The image information storage device according to claim 2, wherein:
   the registration information storage unit stores the registration information which has previously been associated with identification information capable of discriminating registration information from other registration information, or the identification information, while associating the registration/identification information with first image data stored in the image data storage unit, and
   the search unit conducts the search for the second image data associated with the registration information in the registration information storage unit based on the identification information.

4. The image information storage device according to claim 1, further comprising a touch panel which functions as the display screen while being capable of detecting a position on the display screen specified using a pointer, wherein:
   when a position on the display screen specified using the pointer is detected by the touch panel while an image represented by a piece of first image data stored in the image data storage unit is displayed on the display screen and the specified position detected by the touch panel is in an area represented by area information, the output control unit outputs the registration information which has been stored in the registration information storage unit while being associated with the area information representing the specified area, or an image representing the registration information, to the display screen, and the search unit conducts the search based on the touch panel's detection of the position specified using the pointer in a prescribed area including the registration information or in the image representing the registration information outputted by the output control unit and displayed on the display screen.

5. The image information storage device according to claim 4, wherein:

the registration information storage unit stores the registration information which has previously been associated with identification information capable of discriminating registration information from other registration information, or the identification information, while associating the registration/identification information with first image data stored in the image data storage unit, and the search unit conducts the search for the second image data associated with the registration information in the registration information storage unit based on the identification information.

6. The image information storage device according to claim 1, wherein:

the registration information storage unit stores the registration information which has previously been associated with identification information capable of discriminating registration information from other registration information, or the identification information, while associating the registration/identification information with the first image data stored in the image data storage unit, and the search unit conducts the search for the second image data associated with the registration information in the registration information storage unit based on the identification information.

7. The image information storage device according to claim 1, wherein when the input for specifying an area represented by area information is made while an image represented by a piece of first image data stored in the image data storage unit is displayed on the display screen, the output control unit outputs the registration information, which has been stored in the registration information storage unit while being associated with the area information representing the specified area, to the display screen.

8. The image information storage device according to claim 1, further comprising a touch panel which functions as the display screen while being capable of detecting a position on the display screen specified using a pointer, wherein:

when a position on the display screen specified using the pointer is detected by the touch panel while an image represented by a piece of first image data stored in the image data storage unit is displayed on the display screen and the specified position detected by the touch panel is in an area represented by area information, the output control unit outputs the registration information which has been stored in the registration information storage unit while being associated with the area information representing the specified area, or an image representing the registration information, to the display screen, and the search unit conducts the search based on the touch panel's detection of the position specified using the pointer in a prescribed area including the registration information or in the image representing the registration information outputted by the output control unit and displayed on the display screen.

9. The image information storage device according to claim 1, wherein:

the registration information storage unit stores the registration information which has previously been associated with identification information capable of discriminating registration information from other registration information, or the identification information, while associating the registration/identification information with first image data stored in the image data storage unit, and the search unit conducts the search for the second image data associated with the registration information in the registration information storage unit based on the identification information.

10. A non-transitory computer-readable record medium storing computer-readable instructions that cause a computer of an image information storage device, equipped with an image data storage unit and a registration information storage unit which stores prescribed registration information while associating the registration information with the first image data stored in the image data storage unit, the registration information storage unit storing registration information for area information representing an area selected from one or more areas that have been set in a drawing area of a piece of first image data stored in the image data storage unit, to execute:

a search step of conducting a search, when an input for specifying an area represented by area information is made while an image represented by first image data stored in the image data storage unit is displayed on a display screen, for second image data associated in the registration information storage unit with registration information that has been associated with area information in the registration information storage unit, based on the registration information associated with area information representing the specified area; and an output control step of outputting a result of the search by the search step to the display screen, wherein:

when the search by the search step finds that multiple pieces of second image data associated with the registration information have been stored in the image data storage unit, the output control step outputs an image represented by one of the multiple pieces of second image data to the display screen while also outputting a menu image, for letting a user select one of a plurality of images represented by the multiple pieces of second image data, to the display screen, and when an input for selecting one of the plurality of images is made by the user via the display screen, the output control step switches the image outputted to the display screen to the selected image.

11. The non-transitory computer-readable record medium according to claim 10, wherein when the input for specifying an area represented by area information is made while an image represented by a piece of first image data stored in the image data storage unit is displayed on the display screen, the output control step outputs the registration information, which has been stored in the registration information storage unit while being associated with the area information representing the specified area, to the display screen.

12. The non-transitory computer-readable record medium according to claim 10, wherein:
- the image information storage device is further equipped with a touch panel which functions as the display screen while being capable of detecting a position on the display screen specified using a pointer, and
- when a position on the display screen specified using the pointer is detected by the touch panel while an image represented by a piece of first image data stored in the image data storage unit is displayed on the display screen and the specified position detected by the touch panel is in an area represented by area information, the output control step outputs the registration information which has been stored in the registration information storage unit while being associated with the area information representing the specified area, or an image representing the registration information, to the display screen, and
- the search step conducts the search based on the touch panel's detection of the position specified using the pointer in a prescribed area including the registration information or in the image representing the registration information outputted by the output control step and displayed on the display screen.

13. The non-transitory computer-readable record medium according to claim 10, wherein:
- the registration information storage unit stores the registration information which has previously been associated with identification information capable of discriminating registration information from other registration information, or the identification information, while associating the registration/identification information with first image data stored in the image data storage unit, and
- the search step conducts the search for the second image data associated with the registration information in the registration information storage unit based on the identification information.

14. The non-transitory computer-readable record medium according to claim 10, wherein when the input for specifying an area represented by area information is made while an image represented by a piece of first image data stored in the image data storage unit is displayed on the display screen, the output control step outputs the registration information, which has been stored in the registration information storage unit while being associated with the area information representing the specified area, to the display screen.

15. The non-transitory computer-readable record medium according to claim 10, wherein:
- the image information storage device is further equipped with a touch panel which functions as the display screen while being capable of detecting a position on the display screen specified using a pointer, and
- when a position on the display screen specified using the pointer is detected by the touch panel while an image represented by a piece of first image data stored in the image data storage unit is displayed on the display screen and the specified position detected by the touch panel is in an area represented by area information, the output control step outputs the registration information which has been stored in the registration information storage unit while being associated with the area information representing the specified area, or an image representing the registration information, to the display screen, and
- the search step conducts the search based on the touch panel's detection of the position specified using the pointer in a prescribed area including the registration information or in the image representing the registration information outputted by the output control step and displayed on the display screen.

16. An image information processing system comprising:
an image information storage device;
a registration information storage unit which stores prescribed registration information while associating the registration information with the first image data stored in an image data storage unit of the image information storage device, the registration information storage unit storing registration information for area information representing an area selected from one or more areas set in a drawing area of a piece of first image data stored in the image data storage unit; and
an information processing device which is connected with the image information storage device and the registration information storage unit and comprises:
- a search unit which conducts a search, when an input for specifying an area represented by area information is made while an image represented by a piece of first image data stored in the image data storage unit of the image information storage device is displayed on a display screen, for second image data associated with registration information, based on the registration information associated with the area information representing the specified area, and
- an output control unit which controls output of a menu image to the display screen while outputting a result of the search by the search unit to the display screen,
wherein:
- when the search by the search unit finds that multiple pieces of second image data associated with the registration information have been stored in the image data storage unit, the output control unit outputs an image represented by one of the multiple pieces of second image data to the display screen while also outputting the menu image, for letting a user select one of a plurality of images represented by the multiple pieces of second image data, to the display screen, and
- when an input for selecting one of the plurality of images is made by the user via the display screen, the output control unit switches the image outputted to the display screen to the selected image.

* * * * *